(12) United States Patent
Hoole

(10) Patent No.: US 6,501,771 B2
(45) Date of Patent: *Dec. 31, 2002

(54) DELAY COMPENSATION

(75) Inventor: Elliott Hoole, Redmond, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/270,987

(22) Filed: Mar. 17, 1999

(65) Prior Publication Data

US 2001/0050947 A1 Dec. 13, 2001

Related U.S. Application Data

(63) Continuation of application No. 08/797,198, filed on Feb. 11, 1997, now Pat. No. 5,907,577.

(51) Int. Cl.[7] .................................................. H04J 13/00
(52) U.S. Cl. ........................ 370/479; 370/281; 375/130
(58) Field of Search ................................. 370/479, 207, 370/206, 208, 209, 210, 252, 320, 335, 342, 281, 295; 375/130, 261, 268, 296

(56) References Cited

U.S. PATENT DOCUMENTS

| | | |
|---|---|---|
| 3,633,107 A | 1/1972 | Brady .......................... 375/267 |
| 3,745,464 A | 7/1973 | Lee .............................. 455/61 |
| 4,412,350 A | 10/1983 | Miedema ..................... 455/306 |
| 4,807,253 A | 2/1989 | Hagenauer ................... 375/284 |
| 4,835,517 A | 5/1989 | van der Gracht et al. ....340/310.07 |
| 5,029,185 A | 7/1991 | Wei .............................. 375/245 |
| 5,056,112 A | 10/1991 | Wei .............................. 375/280 |
| 5,084,869 A | 1/1992 | Russell ........................ 370/329 |
| 5,088,113 A | 2/1992 | Wei .............................. 375/280 |
| 5,295,152 A | 3/1994 | Gudmundson et al. ..... 370/342 |
| 5,305,353 A | 4/1994 | Weerackody ................ 375/347 |
| 5,410,538 A | 4/1995 | Roche et al. ................ 370/479 |
| 5,654,955 A | 8/1997 | Natali .......................... 370/320 |
| 5,657,313 A | 8/1997 | Takahashi et al. .......... 370/491 |
| 5,657,355 A * | 8/1997 | Reusens ....................... 375/340 |
| 5,694,388 A | 12/1997 | Sawahashi et al. ......... 370/206 |
| 5,732,068 A | 3/1998 | Takahashi et al. .......... 370/206 |
| 5,732,113 A | 3/1998 | Schmidl et al. ............. 375/355 |
| 5,734,647 A | 3/1998 | Yoshida et al. ............. 370/335 |
| 5,799,000 A * | 8/1998 | Hoole .......................... 370/210 |
| 5,802,044 A * | 9/1998 | Baum et al. ................. 370/330 |
| 5,875,208 A | 2/1999 | Hoole .......................... 375/130 |
| 5,907,577 A * | 5/1999 | Hoole .......................... 375/200 |

* cited by examiner

Primary Examiner—Dang Ton
Assistant Examiner—Brian Nguyen
(74) Attorney, Agent, or Firm—Perkins Coie LLP

(57) ABSTRACT

In a discrete tone system, a base station receives a transmission burst from a remote unit being installed that includes delay compensation pilot tones that are uniformly spread throughout the transmission bandwidth. The arrival time transmission burst is not synchronized with the other remote units transmitting to the base station. The base station measures the phase delay of each tone and calculates the delay of the remote unit from the slope of the line of phase angle versus tone frequency. The base station transmits a signal to the remote unit that includes the magnitude and direction of the delay, which allows the remote unit to adapt the timing of its transmission to be synchronized with the other remote units.

6 Claims, 4 Drawing Sheets

FIG. 8

|  | TONES FROM LOWER SUB-BAND | | | TONES FROM UPPER SUB-BAND | | | |
|---|---|---|---|---|---|---|---|
|  | $S_0$ | $S_1$ | ... $S_{15}$ | $S_{16}$ | $S_{17}$ | ... $S_{31}$ | |
| BURST 0 | [DCP0] | [DCP1] | ... [DCP15] | [DCP0] | [DCP1] | ... [DCP15] | |
| BURST 1 | [DCP0] | [DCP1] | ... [DCP15] | [DCP0] | [DCP1] | ... [DCP15] | DCPs |
| BURST 2 | [DCP0] | [DCP1] | ... [DCP15] | [DCP0] | [DCP1] | ... [DCP15] | FROM |
| ⋮ | ⋮ | ⋮ | ⋮ | ⋮ | ⋮ | ⋮ | ANTENNA ELEMENT 0 |
| BURST 7 | [DCP0] | [DCP1] | ... [DCP15] | [DCP0] | [DCP1] | ... [DCP15] | |

|  | $S_{32}$ | $S_{33}$ | ... $S_{47}$ | $S_{48}$ | $S_{49}$ | ... $S_{63}$ | |
|---|---|---|---|---|---|---|---|
| BURST 0 | [DCP0] | [DCP1] | ... [DCP15] | [DCP0] | [DCP1] | ... [DCP15] | |
| BURST 1 | [DCP0] | [DCP1] | ... [DCP15] | [DCP0] | [DCP1] | ... [DCP15] | DCPs |
| BURST 2 | [DCP0] | [DCP1] | ... [DCP15] | [DCP0] | [DCP1] | ... [DCP15] | FROM |
| ⋮ | ⋮ | ⋮ | ⋮ | ⋮ | ⋮ | ⋮ | ANTENNA ELEMENT 1 |
| BURST 7 | [DCP0] | [DCP1] | ... [DCP15] | [DCP0] | [DCP1] | ... [DCP15] | |

⋮

|  | $S_{224}$ | $S_{225}$ | ... $S_{239}$ | $S_{240}$ | $S_{241}$ | ... $S_{255}$ | |
|---|---|---|---|---|---|---|---|
| BURST 0 | [DCP0] | [DCP1] | ... [DCP15] | [DCP0] | [DCP1] | ... [DCP15] | |
| BURST 1 | [DCP0] | [DCP1] | ... [DCP15] | [DCP0] | [DCP1] | ... [DCP15] | DCPs |
| BURST 2 | [DCP0] | [DCP1] | ... [DCP15] | [DCP0] | [DCP1] | ... [DCP15] | FROM |
| ⋮ | ⋮ | ⋮ | ⋮ | ⋮ | ⋮ | ⋮ | ANTENNA ELEMENT 7 |
| BURST 7 | [DCP0] | [DCP1] | ... [DCP15] | [DCP0] | [DCP1] | ... [DCP15] | |

1) $S_0$ IS CORRELATED WITH $S_{16}$, $S_{32}$, $S_{48}$, ... $S_{240}$ AND $S_{16}$, $S_{32}$, ... $S_{240}$ ARE MULTIPLED BY THE NORMALIZED CORRELATION COEFFICIENTS
2) $S_0$ IS ADDED TO THE NEW $S_{16}$, $S_{32}$, ... $S_{240}$
3) THE RESULTING SEQUENCE IS CORRELATED WITH S TO GIVE THE PHASE ANGLE
4) STEPS 1, 2 AND 3 ARE REPEATED FOR $S_1$, $S_{17}$, $S_{33}$, ... $S_{241}$, THEN FOR $S_2$, $S_{18}$, ... AND SO ON TO GET 16 PHASE ANGLES $$S = [1-i, -1+i, 1+i, -1+i, -1-i, -1+i, -1-i, 1-i]$$

DELAY COMPENSATION

CROSS-REFERENCES TO RELATED APPLICATIONS

This is a continuation of application Ser. No. 08/797,198, filed Feb. 11, 1997, now U.S. Pat. No. 5,907,577.

The invention disclosed herein is related to the US patent application by Alamouti, al., entitled "Method for Frequency Division Duplex Communications", Ser. No. 08/796,584, filed Feb. 6, 1997, now U.S. Pat. No. 5,933,421, assigned to AT&T, and incorporated herein by reference.

FIELD OF THE INVENTION

This invention involves improvements to delay compensation systems and methods in a wireless discrete tone communications system.

BACKGROUND OF THE INVENTION

Wireless communications systems, such as cellular and personal communications systems, operate over limited spectral bandwidths and must make highly efficient use of the scarce bandwidth resource to provide good service to a large population of users. The Personal Wireless Access Network described in the Alamouti, et al. Patent application cited above, is an example of a successful technology for wireless service.

The personal wireless access network (PWAN) system described in the referenced Alamouti et al. patent application, uses a form of protocol known as discrete tone to provide efficient communications between a base station and a plurality of remote units. In this protocol, the user's data signal is modulated by a set of weighted discrete frequencies or tones. The weights are spatial spreading codes that distribute the data signals over many discrete tones covering a broad range of frequencies or tones. The weights are complex numbers with the real component acting to modulate the amplitude of a tone while the complex component of the weight acts to modulate the phase of the same tone. Each tone in the weighted tone set bears a different data signal. The weighted tone set for a particular user is transmitted to the receiving station where it is processed with spatial despreading codes to recover the user's data signal. For each of the spatially separated antennas at the receiver, the received discrete tone signals are transformed from time domain signals to frequency domain signals. Despreading weights are assigned to each frequency component of the signals received by each antenna element. The values of the despreading weights are combined with the received signals to obtain an optimized approximation of individual transmitted signals characterized by a particular discrete tone set and transmitting location. The PWAN system has a total of 2560 discrete tones (carriers) equally spaced in 8 MHz of available bandwidth in the range of 1850 to 1990 MHz. The spacing between the tones is 3.125 kHz. The total set of tones are numbered consecutively from 0 to 2559 starting from the lowest frequency tone. The tones are used to carry traffic messages and overhead messages between the base station and the plurality of remote units. The traffic tones, are divided into 32 traffic partitions, with each traffic channel requiring at least one traffic partition of 72 tones.

In addition, the PWAN system uses overhead tones to establish synchronization and to pass control information between the base station and the remote units. A Common Link Channel (CLC) is used by the base to transmit control information to the Remote Units. A Common Access Channel (CAC) is used to transmit messages from the Remote Unit to the Base. There is one grouping of tones assigned to each channel. These overhead channels are used in common by all of the remote units when they are exchanging control messages with the base station.

In the PWAN system, Frequency Division Duplexing, (FDD) is used by the base station and the remote unit to transmit data and control information in both directions over different frequencies. Transmission from the base station to the remote unit is called forward transmission and transmission from the remote unit to the base station is called reverse transmission. The base station and each remote unit must synchronize and conform to the timing structure and both the base station and the remote unit must synchronize to a framing structure. All remote units and base stations must be synchronized so that all remote units transmit at the same time and then all base stations transmit at the same time. When a remote unit initially powers up, it must acquire synchronization from the base station so that it can exchange control and traffic messages within the prescribed time format. The remote unit must also acquire phase synchronization for the signals so that the remote is operating at the same frequency and phase as the base station.

When a remote unit is first installed, it transmits a signal over the CAC channel to the base station. This signal will probably be received at the base station at a time which is not the same as the other remote units transmitting to the base station. The difference between the expected time of the signal, and the time that the signal actually arrives at the base station, is the delay.

Previous systems that compensate for this delay have included systems which have a delay time measurement resolution that is limited. Furthermore, delay time measurement in a protocol is subject to both noise noise and multipath fading.

SUMMARY OF THE INVENTION

This invention solves the delay compensation problem by providing the base station with the ability to measure the magnitude and angle of the phase of delay compensation tones transmitted by the remote unit (RU) on the Common Access Channel (CAC), and calculating the slope of the phase ramp across the frequency range. Because the delay is proportional to the slope of the phase ramp, the delay can be calculated and transmitted to the RU on the Common Link Channel. The RU is provided with the ability to adjust the timing of the signals sent from the RU to the base station on the CAC.

The delay compensation pilots are discrete tones with frequencies that are uniformly spaced throughout each of the upper and lower sub-band frequency ranges. These tones are transmitted by the RU on the CAC and received by the base station. The received tones are digitized, sampled, passed through a Fast Fourier Transform (FFT) processor and stored in FFT incremental frequency bins as complex numbers. These numbers represent points in a 16 Quadrature Amplitude Modulation (QAM) constellation and are related to the average amount of energy of the received tone in the increment of frequency represented by the FFT bin.

In accordance with this invention, the base station uses the information about the signals received, as represented by the FFT bins, to calculate the amount of delay and prepare a signal containing the corresponding amount of compensation to be sent to the RU on the CLC.

In accordance with the invention, the phase difference between the expected phase angle and the received phase angle is calculated for each delay compensation pilot (DCP) tone. The difference in phase between each successive DCP tone is proportional to the time delay and the uniform frequency difference between tones. Because of this, the plot of phase difference as a function of frequency is a constant slope line, where the slope is proportional to the time delay.

In a first embodiment of the invention, the phase angle differences are measured by taking the FFT output representing the first DCP and multiplying it by the complex conjugate of the all sixteen of the FFT outputs from one of the two sub-bands. This gives sixteen phase angle measurements for slope calculation.

In a second embodiment of the invention, each symbol corresponding to the 16 elements of the QAM constellation is correlated with each symbol sequence from the sixteen FFT outputs from one sub-band. This allows sixteen phase-angle measurements based on the correlation coefficients.

In a third embodiment of the invention, the output of the FFT from both sub-bands is used. Sixteen symbol sequences are created from each sub-band, and then the first sequence of each sub-band are added to each other, then the second sequence of each sub-band, and so on until the sixteenth sequence of each sub-band are added together. Sixteen phase angle measurements are generated when the QAM symbol sequence is correlated with each of the 16 symbol sequences.

In a fourth embodiment of the invention, the output of the FFT from both sub-bands and from eight antenna elements is used. Sixteen symbol sequences are received from each sub-band for each antenna element. Sixteen symbol sequences are created when the 32 first sequences of each sub-band for each antenna element are summed, then the 32 second sequences of each sub-band for each antenna are summed, and so on until the 32 sixteenth sequences of each sub-band for each antenna are summed. Each summed sequence is normalized and correlated with the QAM symbol sequence to generate 16 phase angle measurements.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

FIG. 8 shows how the Final algorithm is implemented to provide phase angle measurements from 256 data points.

DETAILED DESCRIPTION

In the personal wireless access network (PWAN) application, there is a need for the radio signals from each remote unit (RU) to arrive at the base station at the same time. The RUs are at different distances from the base station. It takes a finite amount of time for signals from each RU to travel to and from the base station. It takes approximately 1 ns per foot for signals to propagate from the transmitter to receiver.

When a RU is installed, it needs to know when to transmit its signals in relation to the signals received from the base station so that its signal will arrive at the base station at the same time as the signals from the other Rus. The base station measures the difference between the expected time of arrival and the actual time of arrival of the RU signals. It then transmits this measurement information to the RU so it can advance or delay the time that it sends signals to the base station.

Figure 1:
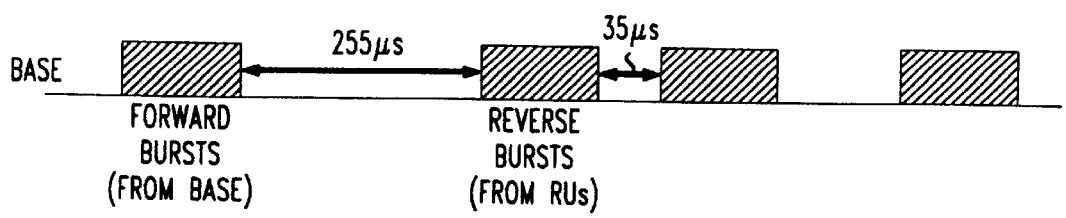
FIG. 1 is a block diagram showing signals sent and received at a base station.
Figure 2:
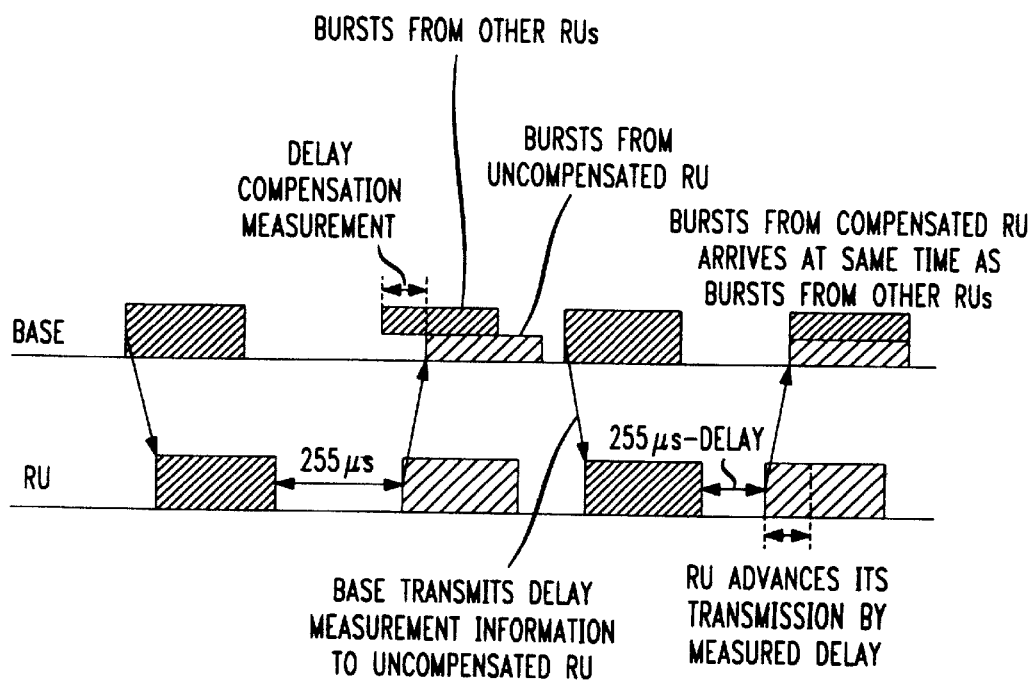
FIG. 2 is a block diagram showing how a delay compensation method acts to synchronize the signals of multiple remote units.

FIG. 1 shows the signals that appear at the base station. The base station expects to see the signals from the RU arrive 225 ms after it transmits its last burst. FIG. 2 shows the signals that appear at the base and the RU. Before the RU is compensated, the signals it transmits arrive at the base at a time that is different from the signals transmitted by the other Rus. The base measures the delay and transmits the measurement to the RU. The RU then adjusts the time of transmission to compensate for the delay.

Delay compensation can be performed upon installation and also at every call setup. The delay compensation calculation routine examines the average signal power in the signals used for the delay calculations and if they are above a certain threshold then a delay compensation measurement is made.

Phase Shift In Time-Delayed Sinusoids

There are sixteen tones available to the RU in each of the upper and lower sub-bands of a sub-band pair for Delay Compensation measurement purposes. These tones are referred to as Delay Compensation Pilots (DCPs).

The RU transmits the DCPs to the base station with each DCP having the same phase shift. If the RU has been compensated properly the DCP tones arrive at the base station in phase with each other. If the signal from the RU is delayed then each of the DCP tones experiences a phase shift.

A single DCP can be represented as a time domain signal in the form:

$$DCP_n(t) = \sin(2\pi f_n t + \phi_n)$$

If the signal is delayed by a time of $\tau$ then the equation of the delayed signal is:

$$DCP_n(t) = \sin(2f_n(t-\tau) + \phi_n) = \sin(2\pi f_n t - 2\pi f_n \tau + \phi_n)$$

Thus a phase difference of $-2\pi f_n \tau$ is introduced by the delay. Each of the DCPs are delayed by the same time, $\tau$. When $\tau = 0$, the DCPs all have the same phase. When $\tau \neq 0$, each of the DCPs has a phase difference proportional to the frequencies of the DCPs.

In the base, tones are 3.125 Khz apart. If two adjacent tones with the same phase are delayed by a time $\tau$, then the phase difference of the delayed tones is $2\pi(3.125 \text{ kHz})\tau$. Thus for every microsecond the signal is delayed, the phase of the adjacent tones defers by 0.019635 radians.

The Base measures the phase of each DCP and uses linear regression to fit the phases to a straight line. The slope of this line is proportional to the delay. A slope of zero indicates that no delay compensation is needed. A positive slope means that the signal is arriving too early and the RU needs to advance transmission of its signal.

Measuring Phase Differences

A tone can be represented by a complex value a+ib. this can also be written in the form $Ae^{j\Theta}$, where $A=(a^2+b^2)_{1/2}$ and $\Theta=\tan^{-1}(b/a)$. Here, A represents the magnitude of the tone and $\Theta$ represents the phase angle of the tone.

There are several ways of measuring the phase difference between two tones. One way is to calculate the phase of each tone and subtract them. This is computationally expensive however, as it requires two arctan computations and two divisions. Another way is to multiply the first complex value by the complex conjugate of the other. Mathematically, this is expressed as:

$$A_1 e^{j\Theta 1} \times B_1 e^{-j\phi 1} = A_1 B_1 e^{j(\Theta 1 - \phi 1)}$$

This results in a complex value that has a phase angle equal to the difference in phases of the two original values. Now, a single arctan and a division can be performed to determine the phase of this value.

If we have a sequence, A, of complex values $A_1 e^{j\Theta 1}$, $A_2 e^{j\Theta 2}$, ... $A_n e^{j\Theta n}$ that are then phase shifted by slightly different amounts, and also attenuated by different amounts to give the sequence B: $B^1 e^{j\Phi 1}$, $B_2 e^{j\Phi 2}$, ... $B_n e^{j\Phi n}$, we can calculate an average phase shift by correlating the original sequence of values with the resulting sequence. Correlation of the sequence A, with the sequence B is defined here as $$\sum_{i=1}^{n} A_i e^{j\theta_i} B_i e^{-j\phi_i}$$

The result of the correlation is known as the correlation coefficient. This is a complex value that has a phase angle equal to a weighted average of the phase differences of the corresponding elements of A and B. If the phase difference between the ith element of each sequence is constant then the correlation coefficient has a phase angle equal to this difference.

Correlation is a function that is very fast to perform on a digital signal processor (DSP) as consists only of multiplications and additions.

Linear Regression

Figure 3:
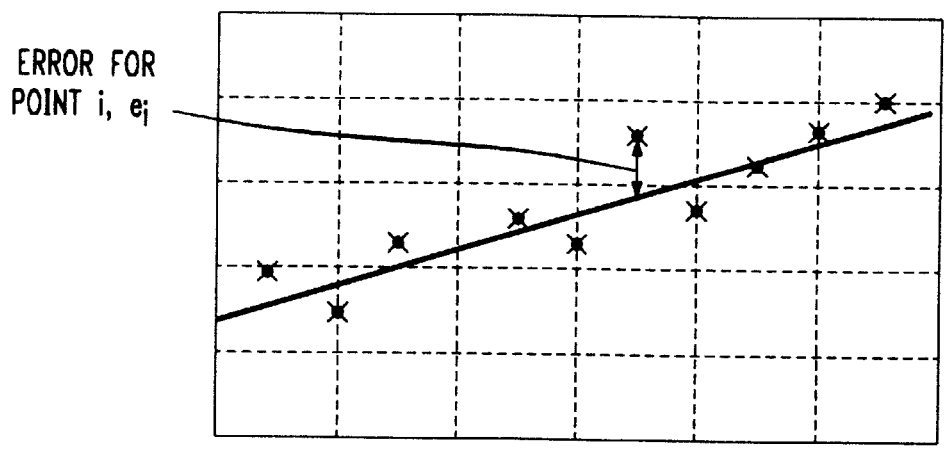
FIG. 3 is a plot showing a best-fit line for nine data points.

FIG. 3 shows how Linear Regression is used to find a line that is the 'best fit' to a set of data points. If is assumed that the data x-coordinates are known exactly and that the y-coordinate error is normally distributed. FIG. 3 shows some data points and the best fit line through those points. The 'best fit' in this case minimizes the sum of the squares of the errors between the y-coordinate of each point and the y value of the line for the x-coordinate of the point. The error, $e_i$ for one of the points is indicated in FIG. 3.

Linear regression is explained in many references. See, e.g.: Press et al., Numerical Recipes in C, ad, ed., Cambridge University Press 1992; Chapra et al., Numerical Methods for Engineers, ad. ed., McGraw-Hill 1989. linear regression algorithm is also included here to aid understanding of how it works and how it used in the Delay Compensation algorithm of this invention.

Let $e_i$ be the error associated with the point $(x_i, y_i)$. Let the equation of the line be y=mx+c. The square of the error $e_i$ is given by: $e_i^2 = (y_i - mx_i - c)^2$ The sum of the squares of the errors is given by:

$$\sum_{i=1}^{n} e_i^2 = \sum_{i=1}^{n} (y_i - mx_i - c)^2$$

where there are n data points.

To minimize the sum of the squares, it is differentiated with respect to m and with respect to c to give two simultaneous equations:

$$\frac{d}{dc}\sum_{i=1}^{n} e_i^2 = -\sum_{i=1}^{n} 2(y_i - mx_i - c) = -2\sum_{i=1}^{n} y_i + 2m\sum_{i=1}^{n} x_i + 2cn$$

$$\frac{d}{dm}\sum_{i=1}^{n} e_i^2 = -\sum_{i=1}^{n} 2x_i(y_i - mx_i - c) = -2\sum_{i=1}^{n} x_i y_i + 2m\sum_{i=1}^{n} x_i^2 + 2c\sum_{i=1}^{n} x_i$$

For the best fit line, $e_i^2$ is at a minimum and the derivatives of $e_i^2$ are equal to zero. Setting the above equations equal to zero and solving for m gives:

$$m = \frac{n\sum_{i=1}^{n} x_i y_i - \sum_{i=1}^{n} x_i \sum_{i=1}^{n} y_i}{n\sum_{i=1}^{n} x_i^2 - \left(\sum_{i=1}^{n} x_i\right)^2}$$

Once m is calculated, c can be found by back substitution as follows:

$$c = \bar{y} - m\bar{x}$$

where the x and y are the mean values of y and x, respectively.

The formula for calculating m can also be written as:

$$m = \frac{\sum_{i=1}^{n} y_i (x_i - \bar{x})}{\sum_{i=1}^{n} (x_i - \bar{x})^2} = \sum_{i=1}^{n} y_i t_i$$

where:

$$t_i = \frac{x_i - \bar{x}}{\sum_{i=1}^{n} (x_i - \bar{x})^2}$$

This can be verified by direct substitution. If the $x_i$ values are the same each time the linear regression algorithm is called, as they are in the case of the delay compensation algorithm, then the $t_i$ values can be calculated once, at initialization, and the slope of the line is calculated by multiplying each $y_i$ by each $t_i$ and summing the results.

In the Delay Compensation algorithm, it is necessary to only solve for m and the final step of solving for c can be left out. The $x_i$ terms remain the same for each iteration of the delay compensation algorithm, so the process of fitting data to a best fit line and finding its slope can be implemented with one multiply and one addition per point on the line. This algorithm is ideally suited for implementation on a DSP.

Unwrapping Phase Angles

Figure 4:
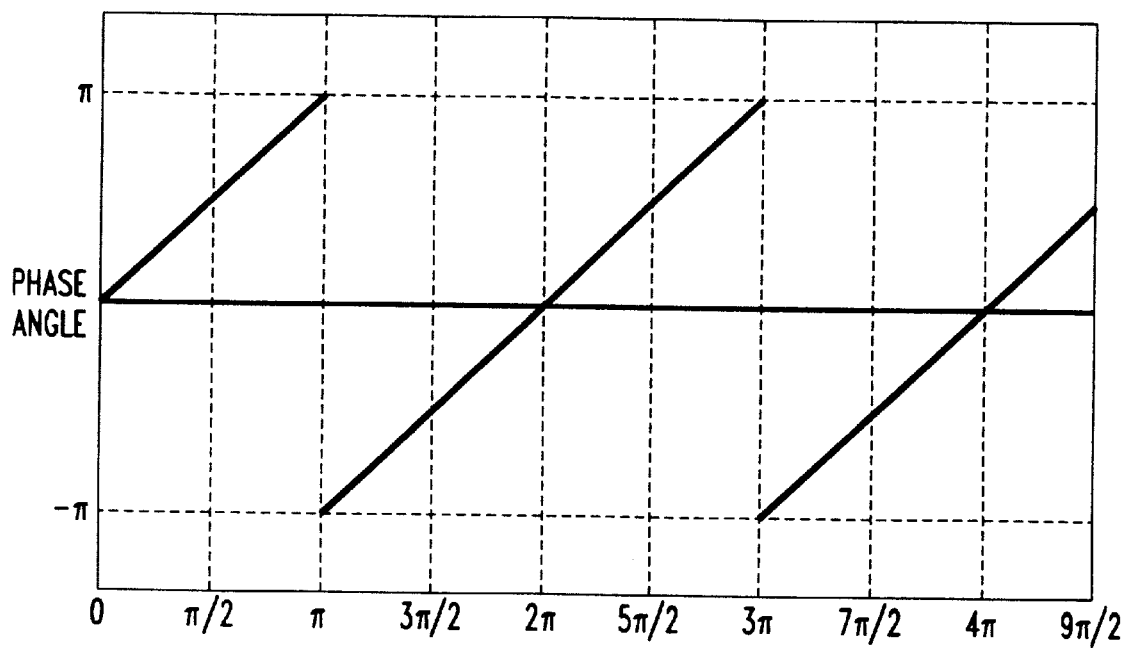
FIG. 4 is a plot showing how phase wrapping results from the use of an arctan function.

The phase angle of a complex value a+jb lies in the range $0 \pm \pi$. If we write this value in the form $Ae^{j\theta}$ then $A=\sqrt{a^2+b^2}$ and $\theta=\tan^{-1}(-b/a)$ The $\tan^{-1}$ function returns a value between $-\pi$ and $\pi$. If $\theta$ is incremented continuously and a graph of the phase angle of $Ae^{j\theta}$ is plotted, the graph in FIG. 4 is the result. The phase angle increments until it reaches n and then jumps back down to $-\pi$. This is known as phase wrapping.

In the Delay Compensation algorithm of this invention the phase angle of each tone is calculated and the best straight line fit of these angles is calculated. However, the phase angles are in the range $0\pm\pi$ and need to be unwrapped before the linear regression algorithm is used on them.

To use the phase unwrapping algorithm, a positive cutoff point (pos_cut) and a negative cutoff point (neg_cut) need to be chosen. The cutoff points are used to decide when an angle needs to be unwrapped. If the difference between two phase angles is outside the range of the cutoff angles then the angles need to be unwrapped. Good, general purpose values for pos-cut and neg-cut are $+\pi$ and $-\pi$ respectively.

In the case of the base station, cutoff points of $+\pi$ and $-\pi$ are good first choice candidates. In simulations, these cutoff angles allowed Rus to be compensated at distances of up to approx 8000 feet. Once the Rus were positioned further away than 8000 feet, the phase difference between the angles was greater than $-\pi$. The unwrap algorithm treats this as a phase difference in the positive direction and doesn't unwrap directly in the positive direction and doesn't unwrap correctly. The way to fix this problem and allow Rus to be compensated at distances of greater than 8000 feet is to change the phase wrap cutoff points. Cutoffs of $+\pi/2$ and $-3\pi/2$ allows Rus to be compensated at up to 12000 feet. Cutoffs of $+\pi/4$ and $-7\pi/4$ could allow compensation at distances of up to 14000 feet.

The phase unwrapping algorithm first creates an array A and sets the first element in A equal to the first phase in the sequence. Next, it finds the difference between adjacent phases and stores these differences in A. The second element in A is set to the difference of the first and second phase angles etc.

The algorithm then creates another array, P. For every entry in A greater than pos_cut, that entry in P is set to $-2\pi$. For every entry in A less than neg_cut, that entry in P is set to $+2\pi$. If an entry in A is in the range neg_cut to pos_cut then the corresponding entry in P is set to 0.

Next each entry in P is replaced by the cumulative sum of all the previous entries. This is done by summing the entries starting at the first element and replacing each element by the sum so far. Once this is done, these elements of P are added to the original phases to give the unwrapped angles.

Phase Unwrapping Example

This example uses the algorithm described above with cutoff points of $0\pm\pi$ to unwrap a typical set of phase angle. The sequence of phase angles is:

{-0.1 -1.2 -2.2 -3.1 2.9 1.4 0.6 -0.8 -1.9 -2.7 2.8}

The array A is:

{-0.1 -1.1 -1.0 -0.9 6 -1.5 -0.8 -1.4 -1.1 -0.8 5.5}

The array P is:

{0 0 0 0 -6.28 0 0 0 0 0 -6.28}

Summing P and replacing each entry with the sum so far gives:

{0 0 0 0 -6.28 -6.28 -6.28 -6.28 -6.28 -6.28 -12.56}

Adding this to the original phase angles gives:

{-0.1 1.2 2.2 -3.1 -3.38 -4.88 -5.68 -6.88 -7.08 -8.18 -8.98 -9.76}

These phases are in a form that can be fitted to a straight line.

DCP Tone Mapping

Figure 5:
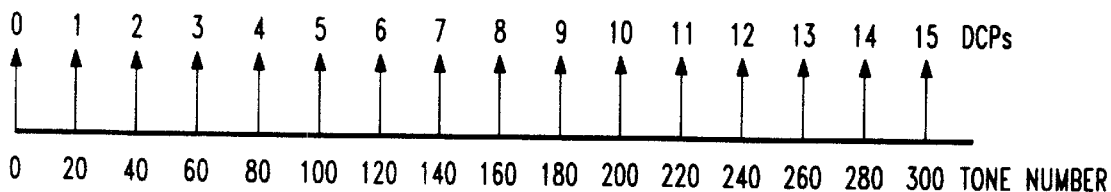
FIG. 5 shows the mapping between Delay Compensation Pilots and the PWANs tone number.

There are 320 tones in each of the upper sub-band of a sub-band pair. Of these 320 tones, 16 are used for delay compensation purposes. They are spaced 20 tones apart throughout the sub-band. The first DCP in a sub-band is at position 0, the next at position 20, etc., with the last tone at position 300. The tones in one sub-band are shown in FIG. 5 The DCPs in a given sub-band are numbered $DCP_0$ to $DCP_{15}$.

For every microsecond the signal form the RU is delayed, there is a phase difference of 0.3927 radians between adjacent DCPs in a sub-band.

Delay Compensation Algorithm

In order to minimize the effects of multipath fading that occur when signals are transmitted between the RU and the base station, DCPs are transmitted during eight consecutive bursts from the RU. Each burst contains 16 DCPs on the upper sub-band and a further 16 DCPs in the lower sub-band.

There are 8 symbols transmitted on the DCPs—one in each burst. This symbol set, S, is represented as $S_0, S_1, \ldots S_7$. $S_0$ is transmitted on all the DCPs of the first burst. $S_1$ is transmitted on all the DCPs of the second burst etc. The symbols are encoded using QPSK encoding and are normalized so their average power is equal to the average power of the traffic channel data.

The actual symbol set transmitted is:

$S=[1-i, -1+i, 1+i, -1+i, -1-i, -1+i, -1-i, 1-i]\times f_n$ where $f_n$ is the normalization factor.

The actual Delay Compensation Algorithm is best described in incremental stages. This helps show how the algorithm has been developed to make it as immune as possible to noise and multipath fading.

A first pass at calculating the phase difference of the DCPs is to simply take the DCPs of the upper or lower sub-band of one tone burst and multiply the first DCP by the complex conjugate of the other DCPs. This gives the phase difference between the DCP and the other DCPs in that burst. These phase differences can then be unwrapped and fitted to a straight line using linear regression. The slope of the line is proportional to the delay.

The above is a perfectly valid method of measuring the delay in the absence of noise, multipath channel fading and other interference. When these factors are taken into account, this algorithm doesn't provide reliable results and a more robust algorithm is required.

Figure 6:
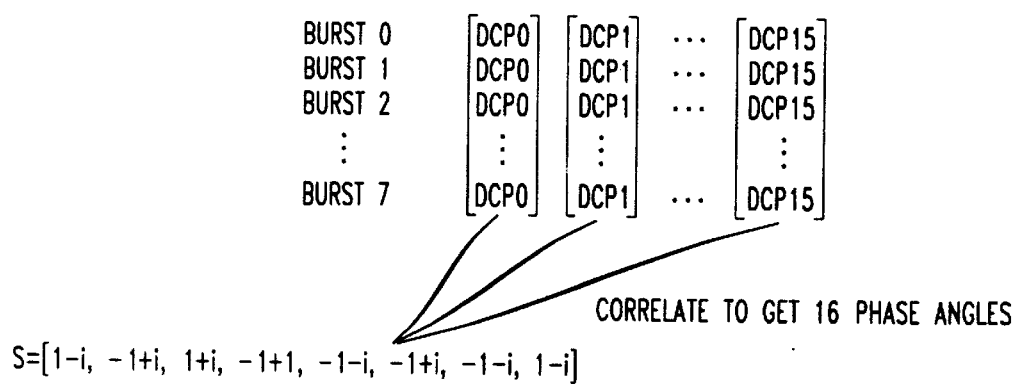
FIG. 6 shows how the Second Pass algorithm is implemented to provide phase angle measurements from 16 data points.

FIG. 6 shows how the Second Pass Algorithm is implemented. A second pass algorithm takes into account the DCPs from the upper or lower sub-band of all the tone bursts. Sixteen sequences are created from the DCPs in each burst. The first sequence consists of the DCP0 from each burst. The second sequence consists of the DCP1 form each burst, etc. The symbol set S is then correlated with each of these sequences. This results in sixteen correlation coefficients. The phase of each coefficient is then calculated and these phases are unwrapped and fitted to a best fit line using linear regression. Once again, the slope of the line is proportional to the delay in the signal from the RU.

This algorithm is much more robust than the first pass algorithm and averages out the effects of noise and multipath fading.

Figure 7:
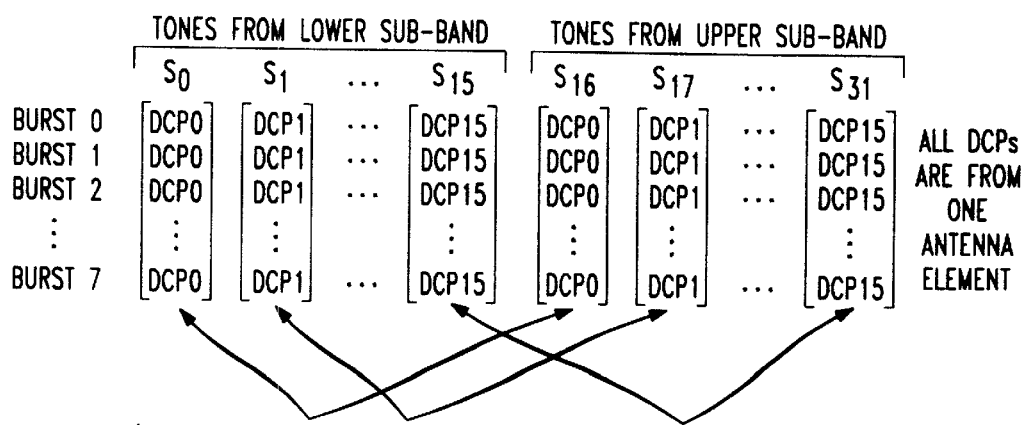
FIG. 7 shows how the Third Pass Algorithm is implemented to provide phase angle measurements from 32 data points.

FIG. 7 shows how the Third Pass algorithm is implemented. Even more accurate results can be obtained by using the DCPs from the upper and lower sub-bands off one antenna element. Thirty two sequences are created from the DCPs from eight bursts. The first sequence, $S_0$ consists of the DCP0 from the lower sub-band of each burst. The second sequence, $S_1$ consists of the DCP1 from the lower sub-band of each burst, etc. The seventeenth sequence, $S_{16}$ consists of the DCP0 from the upper sub-band of each burst etc.

Next $S_0$ and $S_{16}$ are correlated with other. This results in a correlation value, the phase angle of which is the phase difference of the two sequences. This correlation value is normalized to give it an absolute value of one. Next, $S_{16}$ is multiplied by the normalized autocorrelation value. This effectively 'rotates' the sequence $S_{16}$ to give it the same phase as $S_0$. Finally the corresponding elements of $S_0$ and $S_{16}$ are summed together. This sum also has the same phase as $S_0$ in the sense that if this sum is correlated with $S_0$, a real value results. This procedure is repeated for $S_1$ and $S_{17}$, $S_2$ and $S_{18}$ and so on until $S_{18}$ and so until $S^{15}$ and $S_{31}$ have been summed.

The original symbol set S is then correlated with each of these newly generated sequences. This results in sixteen correlation coefficients. The phase of each coefficient is then calculated and these phases are unwrapped and fitted to a best fit line using linear regression. Once again, the slope of the line is proportional to the delay in the signal from the RU.

Simulations have shown that this algorithm improves upon the results of the second pass algorithm.

FIG. 8 shows how the Final Algorithm is implemented. The Final Algorithm uses the DCP tone information from all eight antenna elements. Each antenna provides 32 sets of eight symbols. There are 32 DCPs per burst from each antenna, and eight bursts. Each set of symbols is made up of eight DCPs from one antenna, one DCP from each burst. The symbol sets from antenna 0 are numbered $S_0$ to $S_{31}$. Those from antenna 1 are numbered $S_{32}$ to $S_{63}$ etc. Those from antenna 7 are numbered $S_{240}$ to $S_{255}$ (see FIG. 4.8). together and then the sum is correlated with the original symbol set, S, to determine the phase angle associated with that tone. To add them together, $S_0$ is correlated with $S_{16}$, the correlation coefficient is normalized and $S_{16}$ is multiplied by the normalized correlation coefficient. The same thing is done with $S_0$ and $S_{32}$, $S_0$ and S48 and so on. Now $S_0$, $S_{16}$, ..., $S_{240}$ are added together and this sum is correlated with S. The angle of the resulting correlation coefficient is the phase angle for that tone.

The above process is then repeated for $S_1$, $S_{17}$, $S_{33}$, $S_{49}$, ..., $S_{241}$ to measure the phase angle for the second tone. This is repeated until all 16 phase angles have been measured. These phases are unwrapped and fitted to a best fit line using linear regression, as before. Yet again, the slope of the line is proportional to the delay in the signal from the RU.

No simulations have been done on the Final algorithm. However, it uses information from all eight antennas and from both sub-bands, averaging the data received before coming up with a result. As noted in the discussion about the Third Pass algorithm, improvements in measurement accuracy were obtained when data from the upper and lower sub-bands were averaged together. The Final algorithm uses eight times the amount of data as the Third Pass algorithm, thus making the measurement less susceptible to noise and multipath fading, and further improvements in measurement accuracy are expected. If processing time of the algorithm is an issue then a reduced version of the final algorithm can be used. In a reduced version, tones are processed from as many antennas as can be processed in the allotted time, with a slight reduction in the accuracy of the results.

Still another alternate embodiment applies the above described invention in the PWAN Frequency Division Duplex Communications System described in the Alamouti, Michaelson et al. patent application cited above.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims:

What is claimed is:

1. A method for providing time delay compensation between first and second stations in a wireless network, comprising:

receiving at the first station a plurality of discrete, delay compensation tones with frequencies that are uniformly spaced throughout a frequency range;

measuring a phase difference between an expected phase angle and a received phase angle for each compensation tone;

calculating a rate of change of phase difference as a function of frequency for said compensation tones;

determining a time delay compensation from said rate of change and said uniform frequency spacing; and sending a signal indicating the time delay compensation to the second station.

2. The method of claim 1, which further comprises:

said plurality of discrete, delay compensation tones being spread in accordance with a spreading code assigned to said first station.

3. The method of claim 2, which further comprises:

sampling and digitizing said discrete tones;

passing said sampled and digitized tones through a fast Fourier transform processor to form a Quadrature Amplitude Modulation (QAM) signal which is related to the average amount of energy of the discrete tones; and storing said QAM signal in FFT incremental frequency bins.

4. The method of claim 3 in Which the calculation step further comprises:

multiplying the QAM signal of one of the received tones by values corresponding to a QAM signal of each of said received tones to form a set of data points, said data points having frequency and phase angle magnitudes;

fitting a line to said data points, said line having a slope measured in units of phase per unit frequency; and multiplying said slope by a coefficient proportional to said uniform frequency spacing.

5. The method of claim 4, wherein said fitting step comprises using a linear regression algorithm to fit said slope.

6. A method for providing time delay compensation between first and second stations in a wireless network, comprising:

receiving at the first station a plurality of discrete, delay compensation tones with frequencies that are uniformly spaced throughout a frequency range;

measuring a phase difference between an expected phase angle and a received phase angle for each compensation tone;

calculating a rate of change of phase difference as a function of frequency for said compensation tones;

determining a time delay compensation from said rate of change and said uniform frequency spacing;

sending a signal indicating the time delay compensation to the second station; and adjusting timing at the second station using said time delay compensation signal.

* * * * *